United States Patent [19]
Miller

[11] 4,296,320
[45] Oct. 20, 1981

[54] AUTOMATIC GAIN CONTROL FOR RADIATION ANALYZER

[75] Inventor: Samuel Miller, South Euclid, Ohio

[73] Assignee: Victoreen, Inc., Cleveland, Ohio

[21] Appl. No.: 138,652

[22] Filed: Apr. 8, 1980

[51] Int. Cl.³ .............................................. G01D 18/00
[52] U.S. Cl. ...................................... 250/252; 250/369
[58] Field of Search ............... 250/252, 361 R, 363 R, 250/369

[56] References Cited

U.S. PATENT DOCUMENTS

| | | | |
|---|---|---|---|
| 3,101,409 | 8/1963 | Fite | 250/363 R |
| 3,270,205 | 8/1966 | Ladd et al. | 250/252 |
| 3,560,744 | 2/1971 | Jordan | 250/252 |
| 3,609,362 | 9/1971 | Laney | 250/252 X |
| 3,922,541 | 11/1975 | Seeman | 250/252 X |
| 4,060,726 | 11/1977 | Luitwieler et al. | 250/252 |

Primary Examiner—Davis L. Willis
Attorney, Agent, or Firm—Yount & Tarolli

[57] ABSTRACT

A gain regulator is disclosed for use in a radiation analyzer system. The analyzer responds to a source of radiation having a known peak in its energy spectrum. Gain errors are detected by accumulating a count corresponding to the difference between the number of radiation particles occurring in windows in the energy spectrum which are above and below the desired centerline of this known peak. These two windows overlap in the area of the centerline. Gain is either incremented or decremented whenever the difference count exceeds preselected limits. The difference count is reset whenever a predetermined number of particles have been detected in either of the windows.

9 Claims, 6 Drawing Figures

AUTOMATIC GAIN CONTROL FOR RADIATION ANALYZER

BACKGROUND AND FIELD OF THE INVENTION

The present invention relates to radiation analyzers, and more particularly to apparatus for automatically controlling the gain of analyzer.

Conventional radiation analyzer instruments include a detector for providing an electrical pulse whenever a radiation particle is detected, and a pulse height analyzer for analyzing the resulting electrical pulses. The pulses provided by the detector have amplitudes which are directly proportional to the energies of the respectively detected particles. The analyzer determines the energy spectrum of the radiation to which the detector is responding by analyzing the distribution of amplitudes of the electrical pulses.

In order to correlate the pulse height distribution with an energy spectrum, the instrument must be calibrated so that a given pulse height can be identified as corresponding to a particle of known energy. Conventionally, calibration was accomplished by analyzing the radiation given off by a known source. Since the actual energy spectrum of that radiation source was known, the radiation analyzer could be calibrated by simply adjusting the system gain until the pulse height spectrum produced by the pulse height analyzer corresponded in scale with the energy spectrum of the source.

In these system, a radiation source (such as Americium 241) was used which had a pronounced peak in its radiation energy spectrum. This would, of course, cause the detector pulse amplitudes to tend to cluster around the pulse height corresponding to the energy of this peak, thereby producing a similar peak to occur in the pulse height spectrum accumulated by the analyzer.

The gain of the analyzer was automatically calibrated by counting the number of pulses occurring in the pulse height channels immediately above and below the pulse height at which it was desired to locate the centerline of the peak in the spectrum. If the system was properly calibrated, the radiation peak would exactly straddle that centerline, and the number of counts in the two windows would be approximately equal. If the gain of the system drifted such that the peak moved above or below that centerline, however, the number of counts occurring in the windows above and below the centerline would differ. This difference information was then used to readjust the system gain to place the peak back on the centerline.

In the system disclosed in the patent to Ladd et al., U.S. Pat. No. 3,270,205, the differences between the number of counts accumulated in the windows above and below the centerline was accumulated on a continuing basis, with the gain of the system being directly proportional to this accumulated count. In another system, disclosed in the patent to Laney, U.S. Pat. No. 3,609,362, the difference count was instead accumulated over fixed time intervals, and the gain was adjusted only if the difference count accumulated during those predetermined time intervals exceeded a preset limit.

SUMMARY OF THE INVENTION

A radiation analyzing system in accordance with the teachings of the present invention accomplishes the adjustment of system gain by accumulating a count corresponding to the difference between the numbers of counts in the windows above and below the centerline, this count being accumulated during an interval determined in accordance with the actual number of radiation pulses occurring in a selected amplitude range.

In accordance with another aspect of the present invention, the windows above and below the centerline of the selected peak overlap to some extent, with the overlapping region being centered on the centerline.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Figure 1:
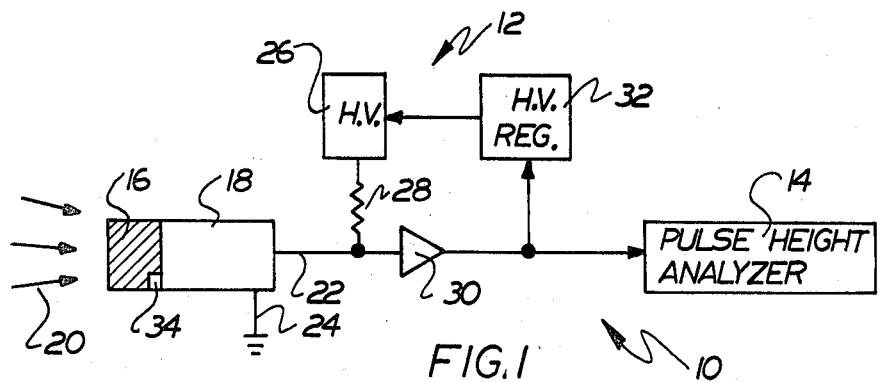
FIG. 1 is a broad block diagram of a conventional radiation analyzing system.
Figure 2:
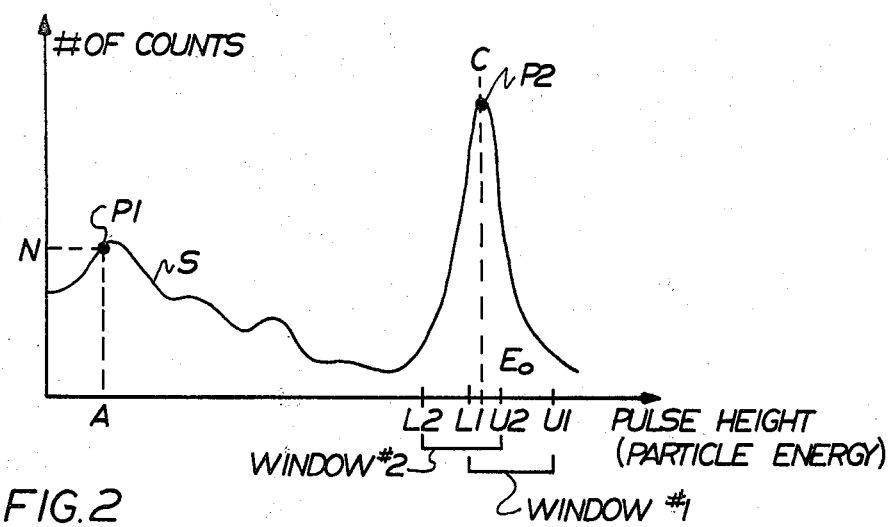
FIG. 2 is an illustration of a pulse height spectrum of the form developed by a radiation analyzing system such as shown in FIG. 1.

There is illustrated in FIG. 1 a broad block diagram illustrating the general form which conventional radiation analyzing systems take. This radiation analyzer 10 includes a detector circuit, generally indicated at 12, which converts the radiation pulses into electrical pulses having amplitudes proportional to the energy thereof. A pulse height analyzer 14 sorts these pulses according to amplitude in order to accumulate a pulse height spectrum, such as illustrated in FIG. 2.

The radiation detector 12 includes a crystal 16 which is optically coupled to a photomultiplier tube 18. The crystal 16 is disposed to receive the radiation 20 which is to be analyzed. Each of the radiation particles 20 which impinges upon crystal 16 will produce a light trail therein, wherein the intensity of the light produced in the crystal 16 is directly proportional to the energy of the particle passing therethrough. The photomultiplier tube 18 converts each light pulse into a corresponding electrical pulse.

The photomultiplier 18 is normally nonconductive but is rendered partially conductive by the passage of light therethrough. In order to detect these momentary changes in the transconductance of the tube 18, a high voltage is applied across electrodes 22 and 24 by a high voltage supply 26. In the illustrated embodiment, a dropping resistor 28 is interconnected between the output of the high voltage supply 26 and electrode 22 of photomultiplier 18.

The transconductance of the photomultiplier tube 18 will normally be very low, so that the voltage appearing at the electrode 22 will essentially correspond with the high voltage signal provided by high voltage source 26. When a radiation pulse stimulates the emission of light from the crystal 16, this light will cause a brief current to flow between electrodes 22 and 24. This will in turn cause a momentary change in the voltage at electrode 22, with the magnitude of the change being proportional to the energy of the detected particle. Thus, the light pulse created in the crystal 16 by the high energy particle will produce a coresponding electrical pulse along the electrode 22 of the photomultiplier tube 18. This pulse is supplied to the pulse height analyzer 14 through a buffer circuit 30, which effectively isolates the high D.C. voltage provided by supply 26 from the pulse height analyzer 14.

The pulse height analyzer 14 measures the amplitude of each of the pulses provided to it by the detector 12, and keeps track of the numbers of pulses occurring in each of a number of contiguous incremental amplitude ranges. The pulse height analyzer 14 will generally include some means (such as cathode ray tube or X/Y plotter) for displaying the accumulated results in the form of a graph. The graph provided by the pulse height analyzer 14 will have a form similar to that shown in FIG. 2. As can be seen in FIG. 2, the display comprises essentially a two-dimensional graph having the pulse height represented on the horizontal axis and the number of counts at that given pulse height represented on the vertical axis. Thus, for example, for the spectrum S illustrated in FIG. 2, the point P1 indicates that N particles having the amplitude A were detected.

Since the amplitudes of the pulses provided by the detector 12 are directly proportional to the energies of the particles 20, this graph also represents a graph of the energy spectrum of the particles 20. As such, it may be used to analyze the elemental composition of the material which emitted the radiation. To do so, however, it is necessary to calibrate the spectrum S so that artifacts in the spectrum (such as peak P1) can be tagged as having occurred at known energy levels. Some means must therefore be provided for adjusting the horizontal scale of the spectrum to correspond with a known energy scale. This is generally accomplished by adjusting the gain of the detector 12, either by adjusting the voltage applied to the photomultiplier tube or by adjusting some other system variable affecting system gain.

Conventional radiation analyzers such as shown in FIG. 1 generally include a regulator circuit such as high voltage regulator 32 for controlling the high voltage source 26 in accordance with the actual distribution of the pulse amplitudes appearing at the output of buffer amplifier 30. The high voltage regulator 32 adjusts the high voltage source 26 so that a known peak in the energy spectrum corresponds to a known pulse height. A radiation source 34 is embedded in the crystal 16 to provide this known peak in the energy spectrum. This source, which may for example be Americium 241, will produce a spectrum having a pronounced peak such as that indicated in FIG. 2 as peak P2.

In accordance with the present invention, this high voltage regulator 32 will accumulate a count corresponding to the difference between the number of pulses occurring in pulse amplitude windows above and below the desired centerline C (corresponding to a known point $E_o$ on the energy scale) of the peak P2. This difference is accumulated over a time interval determined in accordance with the actual number of pulses occurring in at least a selected amplitude range. The regulator will adjust the setting of the high voltage source 26 whenever this difference exceeds a preselected limit.

Figure 3:
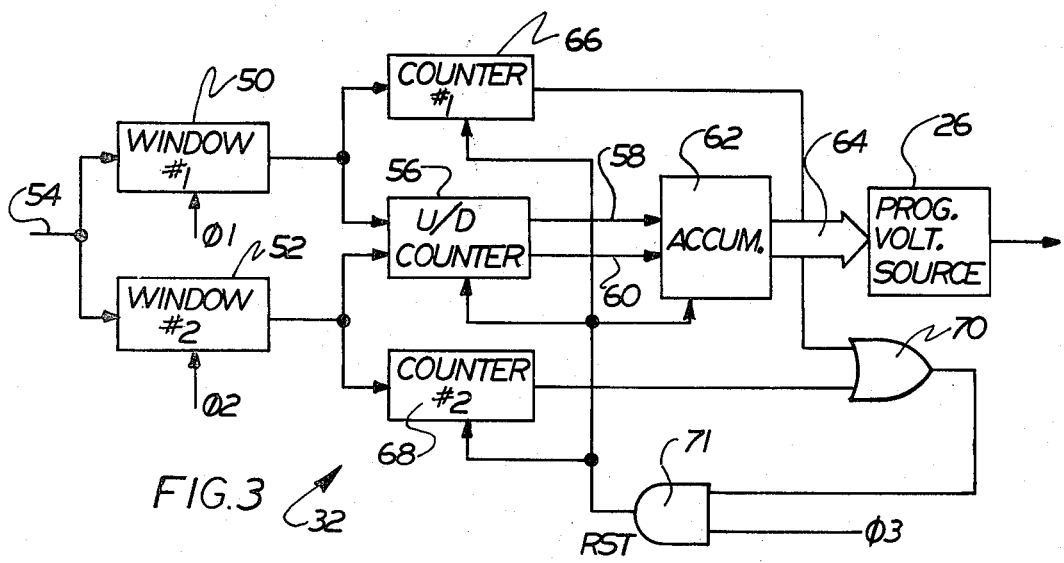
FIG. 3 is a broad block diagram of a gain regulator in accordance with the teachings of the present invention.

One embodiment of a high voltage regulator 32 for accomplishing this function is illustrated in FIG. 3. The voltage regulator 32 illustrated in FIG. 3 includes first and second window circuits 50 and 52 which respond to the pulses supplied by the buffer amplifier 30 along an input line 54. These window circuits 50 and 52 include pulse height discriminators for determining whether a given pulse provided along input line 54 falls within a selected amplitude range, referred to hereinafter as a pulse amplitude "window". Whenever a pulse appearing at the input line 54 falls within a window associated with one of window circuits 50 and 52, that circuit will detect this occurrence and will gate the correspondingly phased clock signal 01 or 02 to the output line thereof.

The lower and upper limits of the pulse amplitude window of window circuit 50 correspond with pulse heights L1 and U1 (see FIG. 2) whereas the lower and upper limits of the window of window circuit 52 correspond with pulse heights L2 and U2 (again, see FIG. 2). Thus, in the embodiment illustrated in FIG. 3, the lower and upper windows 50 and 52 overlap in the region of the desired centerline C. Preferably, the two windows will have substantially equal "widths" and will overlap so that the overlapping region exactly straddles the desired centerline C.

As long as the high voltage source 26 is correctly adjusted, the peak P2 will exactly straddle the desired centerline C, hence the number of pulses having amplitudes falling in window number one will be substantially the same as the number of pulses having amplitudes falling in window number two. Should the high voltage source 26 be misadjusted in some manner, however, the peak P2 will be displaced slightly to the left or right of the desired centerline C. This will shift a number of the pulses from one of the two windows into the other of the windows. Consequently, counts will accumulate more rapidly in one of the windows than the other. This characteristic is utilized to detect whether or not the peak is properly located at the centerline C.

To this end, the outputs of the window circuits 50 and 52 are respectively connected to the count-up and count-down inputs of an up/down (U/D) counter 56. With each of the clock pulses provided by window circuit 50, the counter 56 will increment the stored count by 1, whereas that count will be decremented by one whenever a clock pulse is provided thereto by window circuit 52. Since it is undesirable to provide clock pulses simultaneously to both the count-up and count-down inputs of the counter 56, the clock pulses 01 and 02 provided by window circuits 50 and 52 should be non-overlapping. Counter 56 will therefore accumulate a count corresponding to the difference between the number of counts appearing in the windows associated with window circuits 50 and 52. The rate at which this error count is accumulated within counter 56 is dependent upon both the overall count rate and the extent of displacement of the peak P2 from centerline C. The sign of the error count is dependent upon the direction of displacement of the peak P2 from the centerline C.

The up/down counter 56 provides two output signals along lines 58 and 60. Line 60 will carry a logic signal identifying the sign of the count accumulated within counter 56. Thus, if more count-down pulses have been received than count-up pulses, then the count contained within counter 56 will be a negative number and the "sign" logic signal provided along line 60 will reflect this fact. Similarly, if more count-up pulses have been received than count-down pulses, then the count contained within counter 56 will be a positive number, and the sign bit provided along line 60 will have the opposite polarity. In the event that this count, whether positive or negative, exceeds a predetermined magnitude, the counter 56 will "overflow" and a high logic signal will be provided along line 58, causing a change in the setting of high voltage source 26. This resetting of the high voltage source 26 is accomplished by means of an accumulator circuit 62.

The accumulator circuit 62 provides a digital word along a control bus 64 to the programmable voltage source 26 to set the magnitude of the voltage provided thereby. When a pulse appears along the line 58 from the up/down counter 56, the accumulator 62 will increment or decrement (depending upon the logic value of the signal supplied along line 60 from up/down counter 56) the control word 64 by a preselected amount. Thus, the voltage signal provided by programmable voltage source 26 will change by a fixed increment, in a direction to move the peak P2 back towards the centerline C.

The length of time that it takes the up/down counter 56 to overflow (presuming a substantially constant count rate) will essentially depend upon the amount by which the peak P2 is displaced from the centerline C. The up/down counter 56 will eventually overflow for even very small deviations between the centerline C and the peak P2. It is not desirable to change the setting of the high voltage source 26, however, unless the displacement between the centerline C and the peak P2 is greater than the amount by which this displacement will be changed by an incremental change in the voltage source 26. Consequently, some means must be provided for periodically resetting the up/down counter 56 to prevent these spurious incremental change commands.

In accordance with the teachings of the present invention, the up/down counter 56 is reset after a time interval which is determined in accordance with the actual number of pulses occurring within a selected amplitude range. The regulator operation is thus independent of actual count rate. More specifically, the high voltage regulator 32 of FIG. 3 keeps track of the number of pulses occurring in each of the windows number one and two and resets the up/down counter 56 whenever either of these exceeds a preselected limit. It is for this purpose that counters 66 and 68 are provided, each having its count input connected to the output of a corresponding one of the window circuits 50 and 52.

Whenever either of the counters 66 or 68 overflows, a high logic level signal will be provided at the output thereof. The overflow lines are logic "OR"ed together by means of an OR gate 70. Therefore, the output of OR gate 70 will shift to a high logic level whenever either of counters 66 or 68 overflows. The output of OR gate 70 enables an AND gate 71 to pass a clock pulse 03. The output of AND gate 71 is connected to the reset input of counter 56 as well as counters 66 and 68, and thus the gated 03 clock pulse accomplishes the resetting of all three thereof. Consequently, in the event that the up/down counter 56 has not overflowed by the time that one of counters 66 and 68 overflows, it will be reset and no incrementing or decrementing of the control word contained within accumulator 62 will result.

Figure 4:
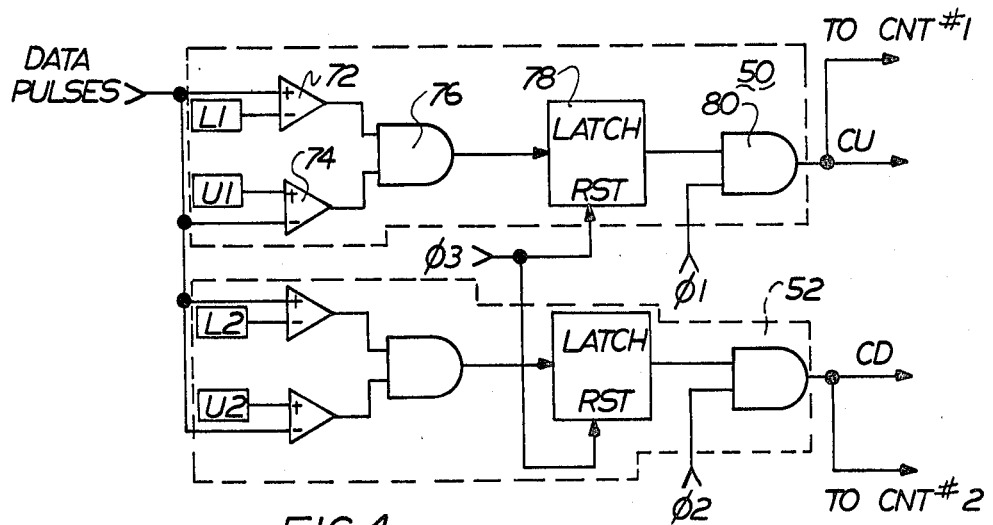
FIG. 4 is a more detailed illustration of the window comparator blocks of the gain regulating system of FIG. 3.

FIG. 4 illustrates in greater detail one form which the window circuits 50 and 52 may take. As can be seen in this figure, the incoming electrical pulses are applied to the inputs of two comparator circuits 72 and 74 which compare the pulse amplitudes with reference signals representing boundaries U1 and L1 of window number one. The output of comparator 72 will be high whenever the incoming electrical signal has an amplitude which is greater than the lower limit L1 of window number one, whereas the output of comparator 74 will be high only when the incoming electrical signal has an amplitude which is below the upper limit U1 of window number one. Thus, the outputs of comparators 72 and 74 will both be high only when the amplitude of an incoming electrical pulse has an amplitude falling between the upper and lower limits of the first window.

An AND gate 76 provides a high logic level signal at its output whenever both inputs thereto are high, thereby providing an indication as to when an incoming data pulse is within the first window. This high logic signal triggers a latch 78. Prior to being triggered, the signal at the output of latch 78 will be a low logic level signal, thereby disabling the supply of clock pulses (01) to the count-up output CU of window circuit 50 by disabling an AND gate 80. When triggered by the high logic level signal appearing at the output of AND gate 76, however, latch 78 will cause its output to shift to a high logic level, thereby enabling AND gate 80 to pass the clock pulse at its next occurrence. Thus, a clock signal will be supplied to the count-up input of U/D counter 56, as well as the input of counter 66. At some time subsequent to this but prior to the next succeeding 01 clock pulse, a differently phased clock pulse (03) will occur, resetting the latch to its previous state wherein AND gate 80 is disabled. Therefore, the occurrence of a data pulse having an amplitude falling within the upper and lower bounds of window number one will enable the passage of a single clock pulse 01 to the output of window circuit 50.

Window circuit 52 has a form substantially identical to that of window circuit 50, except that the reference signals applied to the two limit comparators will represent the upper and lower bounds U2 and L2 of the second window, and the clock signal supplied to the output of AND gate (corresponding to AND gate 80 in window circuit 50) will have a different phase (02) and will occur in-between the occurrences of clock pulses 01 and 03. As stated previously, these three clock pulses are non-overlapping.

Of course, any convenient clock circuit (not shown) may be used to provide the clock pulses 01, 02 and 03. The three clock phases will have a common periodicity but will be phase displaced so that 01, 02 and 03 always occur in a non-overlapping sequence.

Pulses having amplitudes in window number one will necessarily pass through window number two on their rising and falling edges. Some means must therefore be provided for preventing this from triggering window circuit 52. This may be accomplished in any convenient manner, as for example, by either slowing the response of the level comparators or by utilizing appropriate logic to inhibit the 02 pulse whenever latch 78 is triggered.

Figure 5:
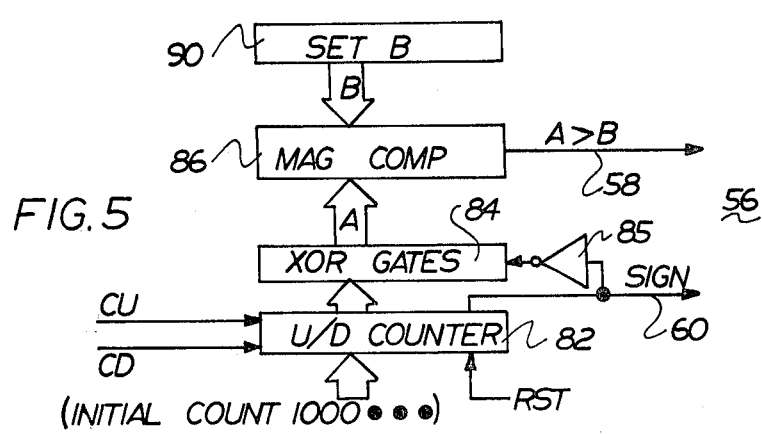
FIG. 5 is a more detailed illustration of the U/D counter block of the gain regulating system of FIG. 3.

FIG. 5 illustrates more specifically one form which the U/D counter 56 may take. This counter 56 includes a conventional bi-directional binary counter which will be loaded in parallel with an initial count value upon each reset. This initial count will be midway between the maximum (1111 . . . 1) and minimum (0000 . . . 0) count, and thus will generally correspond to a binary value of 1000 . . . 0. This initial value will be incremented or decremented by the count-up and count-down pulses provided by window circuits 50 and 52, in the fashion described previously. As long as the cumulative count is above the initial value, the count (ignoring the most significant bit, which will always be "1" in this case) will reflect the magnitude of the error count. In the event that the cumulative count is below the initialed value, however, the count (again ignoring the most significant bit, which will then be "0") will represent the twos compliment of the magnitude of the error count. The most significant bit will indicate whether the cumulative count is above (i.e., positive error) or below (i.e., negative error) the initial value, and thus whether or not the remaining bits are a twos complement representation of the magnitude of the error count.

A series of exclusive OR gates 84 are provided for the purpose of converting a twos compliment "negative" error value into an uncomplemented "positive" error value. Under control of the most significant bit, the gates 84 will either provide an inverted or non-inverted version of the cumulative count to magnitude comparator 86. Thus, the most significant bit of the count contained within counter 82, as inverted by an inverter 85, is supplied to one input of a plurality of exclusive OR gates, whereas the remaining input of each of the exclusive OR gates is connected to a corresponding one of the bits of the count contained within counter 82, provided in parallel to the exclusive OR gates 84.

As long as the most significant bit of the count contained within up/down counter 82 has a binary "1" value, inverter 85 will supply a "0" to one input of each of the exclusive OR gates. The exclusive OR gates will then essentially function as non-inverting buffers, and will transfer the cumulative count to a magnitude comparator 86, substantially without change. In the event that the most significant bit of the count contained within counter 82 is a binary "0", however, inverter 85 will provide a "1" to gates 84, causing them to invert all of the remaining bits in the count. The twos compliment signal is thus converted into an uncomplemented form. Therefore, regardless of whether the up/down counter 82 counts up or down from its initial value, the signal supplied to magnitude comparator 86 (which does not include the most significant bit of the cumulative count) will always have a binary value which is directly proportional to the magnitude of the error. The SIGN signal provided along line 88 will have a binary value indicative of whether that magnitude is in a positive or negative direction.

Magnitude comparator 86 compares the magnitude of this error with a preset value set into a series of thumbwheel switches, indicated in FIG. 5 as "set B" circuit 90. This magnitude comparator will provide a high logic level signal at its output 58 whenever the magnitude of the error (A) is greater than the limit (B) set in the thumbwheel switches 90. The output signals 58 and 60 are provided to the accumulator circuit 62, shown in greater detail in FIG. 6.

Figure 6:
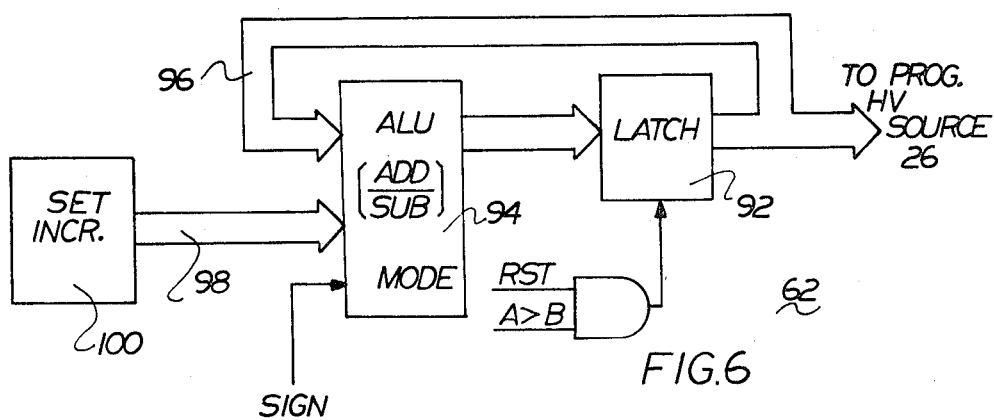
FIG. 6 is a more detailed illustration of the accumulator block of the FIG. 3 gain regulating system.

As can be seen in FIG. 6, the accumulator circuit 62 actually comprises a latch circuit 92, together with an arithmatic logic unit (ALU) 94 for adding or subtracting an incremental binary value from the count contained within the latch 92. The ALU 94 is controlled by the signals provided thereto by the U/D counter circuit 56 and the reset pulse provided by AND gate 71. The SIGN signal provided along line 60 controls the mode of ALU 94, placing it in an "add" mode when this SIGN bit has a binary value of "0", and in a "substract" mode when this SIGN bit has a binary value of "1". The ALU will continuously add or subtract, as the case may be, the two binary words appearing at the inputs 96 and 98 thereof and will provide the resultant signal at the output thereof. One of the inputs 96 to the ALU 94 is derived from the output of the latch 92 and represents the present HV control signal. The other input 98 is derived from a "set increment" circuit 100, which may be either hard-wired or manually controllable, as by thumbwheel switches. The value provided by circuit 100 will determine the increments by which the high voltage control signal (at the output of latch 92) will change upon each occurrence of the update command provided on line 58.

The results of this arithmatic operation, representing the updated HV control signal, will be loaded into the latch 92 whenever AND gate 95 is enabled to pass the reset signal. Enablement of gate 95 is controlled by the update command line 58. Thus, whenever the error count exceeds the selected limit, the update command line 58 will go high and an updated HV control signal will be loaded into latch 92.

Although the invention has been described with respect to a preferred embodiment, it will be appreciated that various rearrangements and alterations of parts may be made without departing from the spirit and scope of the invention, as defined in the appended claims.

What is claimed is:

1. In a system for regulating the system gain of a radiation detecting system including detector means responsive to radiation to produce corresponding electrical pulses having a gain adjustable in accordance with the gain of said detector means and where a known radiation source causes said detector means to produce electrical pulses whose amplitudes tend to cluster about a specific amplitude, it being desired to regulate the gain of said detector means so thatsaid specific amplitude corresponds to a preselected amplitude, and where first counter means accumulates a first count corresponding to the difference between the number of said pulses having amplitudes within selected amplitude ranges above and below said preselected amplitude, said detector means responding to said first count to adjust its gain whenever said count exceeds a given limit, the improvement comprising means responsive to said pulses for resetting said accumulated count at intervals determined in accordance with the actual number of said pulses in at least a selected amplitude range.

2. The improvement as set forth in claim 1, wherein said system further includes means for incrementing said first accumulated count when a said pulse occurs falling within a first amplitude range generally above said preselected amplitude and means for decrementing said first accumulated count when a said pulse occurs falling within a second amplitude range generally below said preselected amplitude, and wherein said first and second amplitude ranges overlap in the vicinity of said preselected amplitude.

3. The improvement of claim 2, wherein said resetting means includes means for resetting said accumulated count whenever a predetermined number of pulses have occurred in either of said amplitude ranges.

4. The improvement as set forth in claim 1, wherein said system further includes second counter means for accumulating a second count corresponding to the number of pulses having amplitudes falling within a selected amplitude range and means for resetting said first count whenever said second count exceeds a selected limit.

5. The improvement as set forth in claim 4, wherein said system further includes third counter means for accumulating a third count corresponding to the number of pulses having amplitudes falling within a selected amplitude range and means for resetting said first count whenever said third count exceeds a selected limit, said amplitude ranges of said second and third counter means being symmetrically disposed generally above and below said preselected amplitude.

6. The improvement as set forth in claim 5, wherein said amplitude ranges of said second and third counters overlap in the vicinity of said preselected amplitude.

7. Apparatus as set forth in claim 1, wherein said detector means comprises means for producing said electrical pulses responsive to said radiation, means for applying a controlled voltage to said electrical pulse producing means, the gain of said electrical pulses being dependent upon said controlled voltage, and means for adjusting said controlled voltage responsive to said first count exceeding said selected limit.

8. A method of regulating the system gain of a radiation detecting system comprising the steps of:
   providing a known radiation source having a known peak in its energy spectrum;
   detecting radiation particles given off by said known radiation source and providing an electrical pulse in response to the detection of each said particle, said pulses each having an amplitude directly related to the energy of the corresponding detected particle;
   setting the gain of said pulses in accordance with a stored gain indication;
   counting the difference between the numbers of particles producing pulses having amplitudes falling within amplitude ranges above and below a preselected amplitude which is desired to correspond to the particle energy at which said known peak is located in said energy spectrum;
   adjusting said stored indication whenever said difference count exceeds a preselected limit; and,
   resetting said difference count to an initial value whenever more than a selected number of electrical pulses in a predetermined amplitude range have occurred since the previous reset.

9. The method of claim 8, wherein said step of resetting said difference count comprises the further steps of counting the number of electrical pulses having amplitudes in amplitude ranges generally above and below said preselected amplitude, and resetting said difference count to an initial value whenever more than a selected number of pulses have occurred in either of said amplitude ranges since the last reset.

* * * * *